United States Patent [19]

Oberdorfer

[11] 4,246,011
[45] Jan. 20, 1981

[54] VACUUM CLEANING APPARATUS

[76] Inventor: Guido Oberdorfer, Werkstrasse 22, 7919 Bellenberg, Fed. Rep. of Germany

[21] Appl. No.: 957,459

[22] Filed: Nov. 3, 1978

[30] Foreign Application Priority Data

Nov. 4, 1977 [DE] Fed. Rep. of Germany ....... 2749480

[51] Int. Cl.³ .............................................. B01D 46/04
[52] U.S. Cl. ....................................... 55/274; 55/283; 55/289; 55/296; 55/299; 55/304; 55/484; 55/DIG. 3
[58] Field of Search ................. 55/216, 272, 274, 283, 55/289, 296, 299, 300, 304, 305, DIG. 3, 295, 484; 15/352

[56] References Cited

U.S. PATENT DOCUMENTS

| | | | |
|---|---|---|---|
| 1,240,305 | 9/1917 | Brooks et al. | 55/304 |
| 2,405,129 | 8/1946 | Bible | 55/296 |
| 2,591,567 | 4/1952 | Lofgren et al. | 55/283 |
| 2,633,206 | 3/1953 | Bruckner | 55/283 |
| 3,277,634 | 10/1966 | Wheaton | 55/304 |
| 3,413,779 | 12/1968 | Takahashi et al. | 55/272 |
| 3,521,430 | 7/1970 | Vanderlip et al. | 55/283 |
| 3,591,888 | 7/1971 | Takeda et al. | 55/300 |
| 3,618,297 | 11/1971 | Hamrick | 55/216 |
| 3,731,465 | 5/1973 | Ohira et al. | 55/299 |
| 3,797,064 | 3/1974 | MacFarland | 55/296 |
| 3,909,219 | 9/1975 | Fromknecht | 55/216 |

FOREIGN PATENT DOCUMENTS 1436403 9/1972 United Kingdom ..................... 55/300

*Primary Examiner*—David L. Lacey
*Attorney, Agent, or Firm*—Wm. R. Price

[57] ABSTRACT

A filter medium for use in a vacuum cleaner is shown with external brush means which is movable across the filter face for cleaning the soil therefrom. The brush means may either be moved manually, by automatic controls, by time switches, by pressure differentials operating in a piston-cylinder arrangement, or by a pressure indicator unit which monitors the clogging condition of the filter. Moreover, control means are provided for protecting the vacuum cleaner drive motor from damage from liquids when liquids may be drawn into the vacuum cleaner.

3 Claims, 2 Drawing Figures

VACUUM CLEANING APPARATUS

BACKGROUND OF THE INVENTION

1. Field of the Invention:

This invention relates to filter cleaning means for vacuum cleaners, and particularly to filters having external brush means that are movable across the filter face for cleaning the soil therefrom.

2. Description of the Prior Art:

The problem in vacuum cleaning equipment is that the filter must be cleaned following a specified operating period. For this purpose customarily the filter is removably mounted on the cleaning unit. But the exchange is cumbersome and produces difficulties, specifically because on reinserting the filter cartridge in the equipment attention must be paid to keeping the existing packings operational; namely to avoid a bypass for the path of intake air. In practice it has been shown that sealing gaskets frequently are damaged, or the filter is badly fitted on its gasket seating, to the detriment of the cleaning effect.

OBJECTS OF THE INVENTION

The object of the invention is, therefore, to provide a filter for a vacuum cleaning apparatus, which can be cleaned without having to remove the filter from the cleaning equipment.

To solve this problem the invention is characterized by an external self-centering brush attached to the filter face, which is movable along said face.

SUMMARY OF THE INVENTION

Brush motions can be produced by various ways and means. With such motion, which is possibly repeated several times, the dirty filter face is cleaned without having to remove the filter cartridge from the unit. The brush always bears against that side of the filter face on which the dirt deposits, that is, on the outside with reference to the flow direction of air passing therethrough.

In case the filter has a circular curvature with corrugated or zig-zag shaped foldings, the brush will be designed as a ring or annular brush, which is shiftable along the filter in a self-centering manner. The brush bristles then place themselves into the zig-zag shaped foldings and thereby simultaneously produce the self-centering.

The brush can be shifted by hand, in which case an externally actuated handle is connected to the brush.

Alternatively the shift of the bursh can be effected automatically by the vacuum cleaning unit itself, in which case a power control means is provided for the brush motion.

Another alternative provides that the shifting of the brush always occurs when specified operating conditions are reached in the cleaning unit, e.g., specified pressure differentials or clogged condition of the filter medium.

In this connection it is further preferred to connect a piston-cylinder arrangement with the brush. Through it the brush is shifted as soon as a preset pressure differential is applied to said piston-cylinder arrangement.

Also, a pressure indicator unit may be connected to one of the piston-cylinder unit lines, by which the pressure differential relative to the ambient air is monitored. Such a pressure indicator unit may be provided for the vacuum cleaner so that the shifting of the brush is caused whenever the clogging of the filter exceeds a preset degree. This cleaning action can be done automatically or manually through an operator.

With such a vacuum cleaner, liquids may also be drawn in. These liquids are not supposed to get into the drive motor used for producing a vacuum. For this purpose a ball valve is provided, which on reaching a specified liquid level closes an appropriate valve opening. With the known design of such a vacuum cleaner, the valve ball is located over an inlet for dirt. In the space between these two levels, therefore, a specified amount of liquid is present, which flows out of the suction port on closing the port through the valve ball. To avoid this disadvantage preferably a ball valve is provided, which is connected by a rod to a float, which float is located below an inlet for the dirt, the valve ball being able to close the access opening to a vacuum drive motor housing. The ball valve, therefore, closes while the liquid level (dirty water level) is still below the inlet for the dirt.

This motion of the float can be used at the same time for switching a switch (not shown) for the vacuum drive ON or OFF; namely, so that the drive is switched off as soon as the float is raised.

BRIEF DESCRIPTION OF THE DRAWINGS

This invention is explained in more detail below with reference to exemplified embodiments, from which further important features become apparent.

Shown in.

Figure 1:
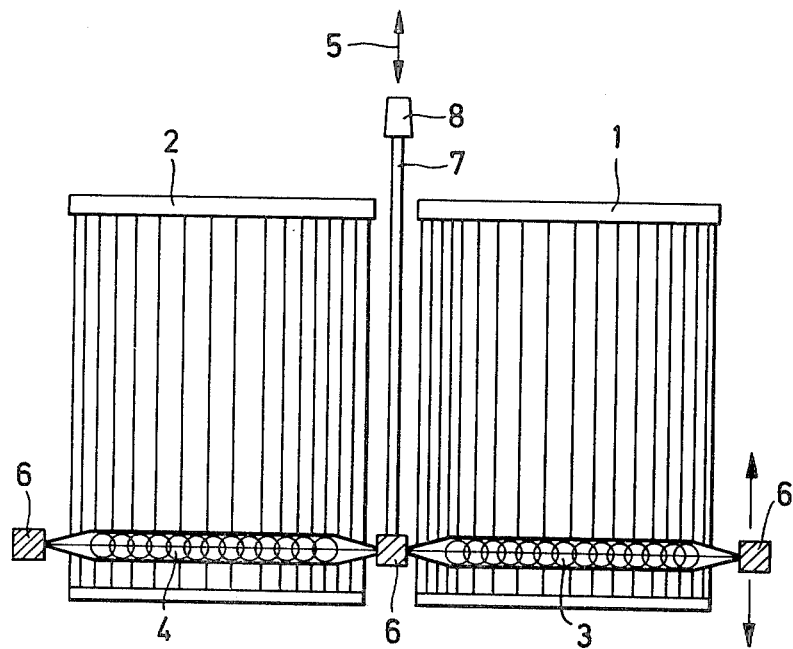
FIG. 1 is a side-elevational view of a filter arrangement with self-centering cleaning means according to the invention.

First the principle of the invention will be explained with reference to FIG. 1. In it, two cylindrical filter cartridges 1, 2 having zig-zag shaped or corrugated walls are arranged side by side. One ring brush 3 for the right filter 1, and a further ring brush 4 for the left filter 2 are shiftable on the outer wall of the filters in the vertical direction of the double arrow 5. They are carried by a guide frame 6. The guide frame is connected to a rod 7, the top end of which terminates in a handle 8, which can be actuated from the outside of an optionally provided housing. Thus the brushes can be moved in the direction of arrow 5 along the clogged-up filter surface, which is thereby cleaned.

Figure 2:
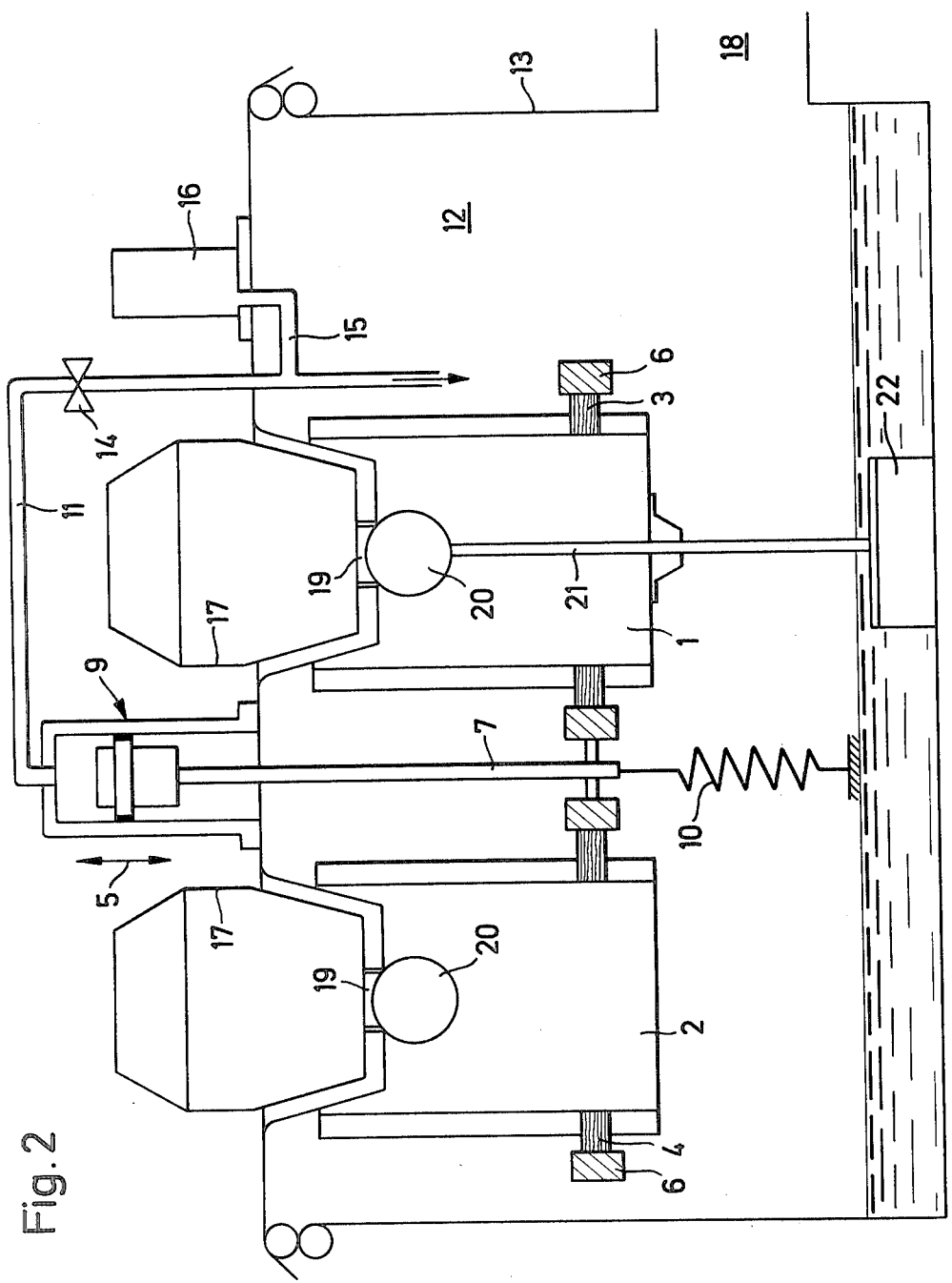
FIG. 2 is a schematic diagram of a vacuum cleaning apparatus using the filter means of FIG. 1.

Basically FIG. 2 shows the same situation, but where no handle 8 is provided on rod 7. Instead, on the top end of rod 7 a piston-cylinder unit 9 is provided, by which the shift in the direction of arrow 5 is produced. At its bottom end, rod 7 is engaged by a tension spring 10. The latter spring 10 is preferably provided also in the embodiment according to FIG. 1. It pulls the ring brushes back down into their initial position.

The piston-cylinder unit 9 is connected to the interior 12 of a vacuum cleaner housing 13 by a vacuum line 11, so that said piston-cylinder unit is operated by the respective prevailing pressure differential. In line 11 a valve 14 may be provided. Furthermore a pressure indicator unit 16 can be connected to line 11 by a branch line 15.

On each filter 1 and 2 a further seal-tight motor-blower housing 17 contains a turbine operated blower, which ensures a partial vacuum. In cleaner housing 13 an inlet opening 18 for dirt is provided. When the turbines are turned on, the piston-cylinder unit 9, with valve 14 open and under the effect of a specified pressure differential, moves the ring brushes 3, 4 upward. When valve 14 is then closed, the pressure differential is reduced, spring 10 again pulls the ring brushes downward to their illustrated initial position.

This ring brush control can be effected also by a pressure indicator unit 16. The latter indicates at what point the filters are clogged to the extent that they have to be cleaned. For this purpose the pressure indicator unit is in constant communication with the interior space 12 by branch line 15.

Another possibility is that when the unit is turned on, the brush or brushes are automatically shifted up and, when turned off, are moved down to the initial position by the spring.

Each housing 17 has a circular opening 19 in the center of their bottom side, each of which is closed by a ball 20, as soon as the ball floats on a liquid. The ball, therefore, is lighter than water. In the emobodiment shown at the right in FIG. 2, the ball has a guide rod 21 connected to it, to the bottom side of which a float 22 is attached. The latter is located below inlet opening 18. If water penetrates into the housing 13 by the inlet opening 18, the float rises and closes the opening 19 by way of rod 21 and ball 20, without allowing any dirty water to get into the space between the levels of inlet opening 18 and opening 19. This motion of the float and of the ball opens a switch, (not shown) which cuts off the drive motor of the cleaning apparatus from the motor supply.

The described device is particularly suitable for vacuum cleaners which are used, e.g., in auto shops. But it is suitable also for cleaning other types of filters.

What is claimed is:

1. A vacuum cleaner including a dust collecting housing, an air inlet and an air outlet in the housing, a motor fan unit for producing a flow of air therethrough, filter means in the housing situated between the air inlet and outlet for filtering dust-laden air, said filter means comprising a pair of cylindrical filter cartridges (1, 2) arranged closely adjacent each other, each filter cartridge having walls of filter material of longitudinally corrugated configuration, and filter cleaning means for removing the dust adhering to the upstream exterior surfaces of the filter cartridges, said filter cleaning means comprising a pair of annular brushes (3, 4) fitted closely around the pair of filter cartridges respectively in a self-centering manner, said brushes being supported by a guide frame 6, and a brush actuation rod (7) interposed between the filter cartridges and joined to the guide frame for reciprocating the brushes back and forth along the filter cartridges.

2. A vacuum cleaner as recited in claim 1 wherein the actuation rod is provided with a piston of a piston-cylinder unit (9), and a vacuum line joins the piston-cylinder unit to the interior of the said housing so that the piston-cylinder unit is operated by the respective prevailing pressure differential, and valve means in the vacuum line for controlling the operation of the said piston, and a tension spring means (10) joined to the other end of the actuation rod for returning the brushes when the pressure differential is reduced.

3. A vacuum cleaner as recited in claim 2 further comprising a pressure indicator unit (16) installed in the vacuum line so as to give an indication at what point the filter cartridges are clogged to the extent they should be cleaned before continuation of the operation of the vacuum cleaner.

* * * * *